United States Patent [19]
Dahl

[11] 3,908,551

[45] Sept. 30, 1975

[54] PROXIMITY FUSE

[75] Inventor: Bjorn Dahl, Kongsberg, Norway

[73] Assignee: A/S Kongsberg Vapenfabrikk, Kongsberg, Norway

[22] Filed: Dec. 28, 1973

[21] Appl. No.: 429,286

[30] Foreign Application Priority Data

Jan. 3, 1973 Norway.................................. 26/73

[52] U.S. Cl......................... 102/70.2 G; 102/70.2 R
[51] Int. Cl.............................................. F42c 11/04
[58] Field of Search...... 102/70.2 G, 70.2 P, 70.2 R

[56] References Cited

UNITED STATES PATENTS 2,926,611 3/1960 Hinman, Jr.................... 102/70.2 G
3,140,661 7/1964 Clarke........................... 102/70.2 G

*Primary Examiner*—Benjamin A. Borchelt
*Assistant Examiner*—C. T. Jordan
*Attorney, Agent, or Firm*—Holman & Stern

[57] ABSTRACT

A proximity fuse for high trajectory weapons, comprising a ram air driven generator generating the supply voltage to the electronic circuit elements of the proximity fuse which control the proximity functions of the fuse. The supply voltage from the generator is blocked at decreasing frequency, whereas the blocking is terminated at increasing frequency. Elements for blocking the electronic circuit comprise a differential amplifier to which a top rectified generator voltage is supplied, and the amplifier has a larger gain in the range where the generator voltage changes from a decreasing to an increasing value.

5 Claims, 4 Drawing Figures

PROXIMITY FUSE

BACKGROUND OF THE INVENTION

The present invention relates to a proximity fuse for high trajectory weapons comprising a ram air driven generator generating the supply voltage to the electronic circuit elements of the proximity fuse which control the proximity functions of said fuse.

In proximity fuses of this type it is of great importance that the electronic functions are kept blocked throughout the greatest possible part of the trajectory of the projectile, thereby preventing undesired detonation of the projectile caused by internal noise or hostile countermeasures (jamming).

SUMMARY OF THE INVENTION

In proximity fuses utilizing a ram air driven generator for the generation of the power supply voltage for the electronic functions of the fuse, the rotational speed of the generator and hence the frequency of the generated voltage will depend upon the flight velocity of the projectile. According to the present invention the blocking of the electronic functions of a proximity fuse is achieved due to the fact that the supply voltage from the generator is blocked at decreasing generator frequency, whereas the blocking is terminated at increasing frequency.

Especially for high trajectory weapons (bomb throwers) the flight velocity will vary very much and in such a way that it is highest at the beginning and at the end of the trajectory and lowest around the top of the trajectory. A usual turbine driven generator will follow this course in such a manner that the frequency of the generator (rotational speed) will have a minimum at the top of the trajectory. The derivative of the generator frequency will have a negative value at the beginning of the trajectory, pass through zero at the top of the trajectory and have a positive value at the final part of the trajectory. In accordance with the invention the blocking elements may comprise a differential amplifier, thereby utilizing the derivative of the generator frequency for keeping the electronic functions of the proximity fuse blocked for approximately 50 percent of the trajectory of the projectile as the derivative of the generator frequency changes from a negative to a positive value at the top of the trajectory. This condition is therefore independent of launching velocity and elevation provided that the generator is constructed in such a way that its rotor follows the velocity variations of the projectile under all conditions. However, a linear relationship between the air velocity and the rotational speed of the generator is not required.

In the following specification the invention will be described in more detail with reference to the accompanying drawings.

IN THE DRAWINGS

DESCRIPTION OF THE PREFERRED EMBODIMENT

Figure 1:
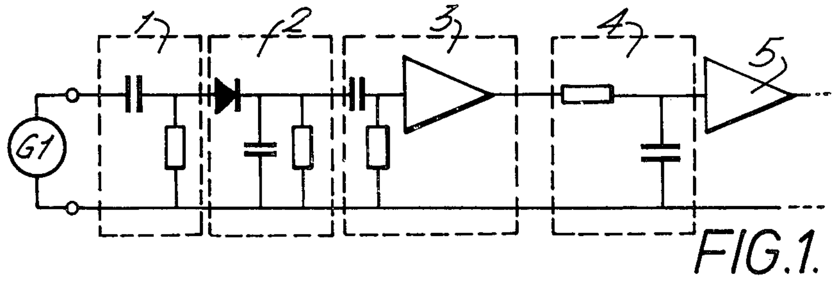
FIG. 1 is a circuit diagram showing a first embodiment of the invention.

In FIG. 1 there is shown a generator G1 supplying an alternating voltage to a high pass filter 1 having an upper cut-off frequency above the highest generator frequency that may occur. The output voltage from the filter 1 will therefore increase in proportion to an increasing rotational speed of the generator, and this voltage is top rectified and filtered in a rectifier unit 2 which, at its output supplies a D.C.-voltage that follows the slow variations of the rotational speed of the generator. This D.C.-voltage controls a differential amplifier 3 having such a large time constant as to be able to follow the slow variations of the D.C.-voltage. The differential amplifier 3 is connected in such a way that a decreasing voltage will not give any output signal from the amplifier 3, whereas an increasing voltage will give an output signal from the amplifier thereby connecting the firing circuit of the proximity fuse via a delay circuit 4 and a level detector 5.

Figure 2:
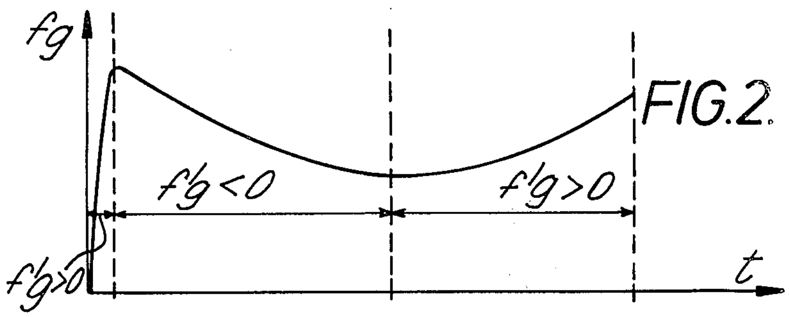
FIG. 2 is a diagram where the generator frequency $f_g$ is plotted as ordinate against the flight time $t$ as abscissa.

In FIG. 2 there is shown a typical course of the generator frequency $f_g$ during the flight time $t$ of the projectile. By a closer study of the derivative of the generators frequency $f_g'$ throughout the trajectory it will be seen that $f_g'$ is positive twice, firstly at starting of the generator (moment of discharge) and secondly at the latter part of the trajectory. The time interval at the starting during which $f_g'$ is positive is, however, very short (approximately 1 sec.) and the proximity fuse can in this period of time be kept blocked by the delay circuit 4 having a delay of approximately 2 sec. Thereby, a blocking of the generator voltage at this critical, initial stage is achieved. When the voltage at the output of the delay circuit 4 has reached a certain level, the level detector 5 comes into operation and connects the remaining electronic circuit which inter alia comprises the firing circuit (not shown) of the projectile.

Figure 3:
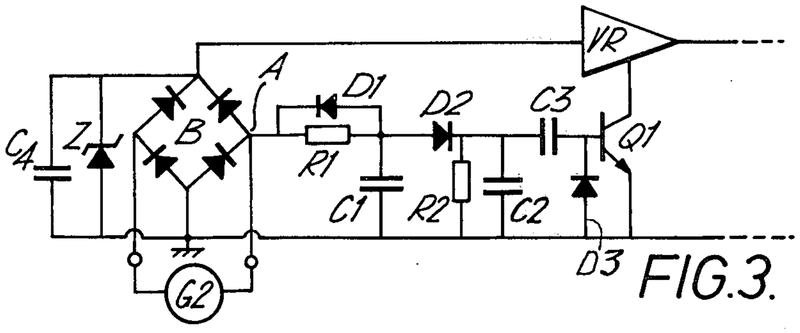
FIG. 3 shows a second embodiment of the invention.

In FIG. 3 there is shown another embodiment of the invention in which the additional delay circuit shown in FIG. 1 is made superfluous. In this case a diode bridge B is used to rectify the voltage from a generator G2. The voltage at point A will approximately have the form of rectangular pulses, the pulse width of which is inversely proportional to the generator frequency. The pulse amplitude will have a value between earth and +V as determined by the zener voltage of a zener diode Z. It is of importance for the further circuitry function that the amplitude at point A is constant and independent of the generator frequency within the frequency range involved, or in other words that the generator then supplies a voltage having a larger value than the reference voltage of the zener diode. During their positive course the pulses at point A will charge a condenser C1 to a certain level through a diode D1. The voltage across the condenser C1 will therefore consist of a plurality of saw-tooth pulses having an amplitude inversely proportional to the generator frequency. These pulses are top rectified through a diode D2 and maintain the charging of a second condenser C2. The condenser C2 and a resistor R2 are designed for giving a delay of such a duration (e.g. 5 sec.) that the D.C.-voltage across C2 just follows the slow variations occurring in the rotational speed of the generator in the trajectory of the projectile.

Figure 4:
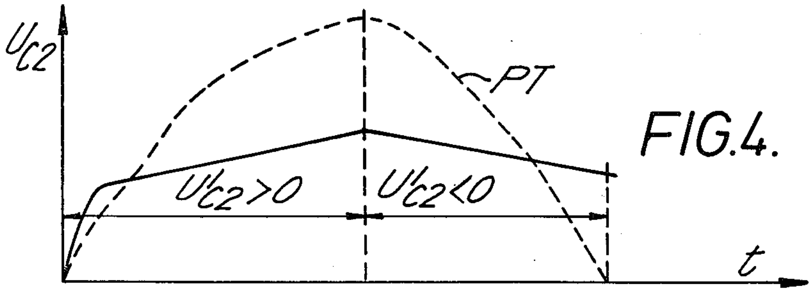
FIG. 4 is a diagram showing the variations of the voltage across one of the circuit elements in relation to the flight time, and also showing the trajectory PT of the projectile.

When the generator frequency decreases, i.e. when the pulse width at point A increases, the top rectification through the diode D2 will cause the condenser C2 to be charged at a constantly increasing voltage $U_{C2}$. This is shown diagrammatically in FIG. 4, in which the voltage $U_{C2}$ and the flight trajectory PT are shown as functions of the flight time $t$. A condenser C3 constitutes together with a diode D3 a differentiator for a transistor Q1, said transistor being on as long as the voltage across C2 is increasing i.e., at decreasing generator frequency. As soon as the voltage C2 starts decreasing (increasing rotational speed), the transistor Q1 will be switched off. In FIG. 3 the transistor Q1, when it is on, is used to block the supply voltage for the remaining electronic circuit during the blocking interval, the blocking being in this case accomplished via a voltage regulator VR. The above mentioned interval, during which $f_g'$ is positive at the start of the trajectory of the projectile, is here maintained by means of the delay inherent in the charging of the condensers C2 and C3 through resistor R1. As will be seen the transistor Q1 will not be switched on until the voltage $U_{C2}$ across the condenser C2 decreases, and for this to be possible the voltage must initially increase, since it can never be negative. This gives the circuit an inherent protection the first seconds after the launching of the projectile, which eliminates the use of additional components as delay elements. A typical voltage course across the condenser C2 is shown in FIG. 4 in which the flight trajectory PT is also plotted. From this figure it is seen that the voltage $U_{C2}$ across the condenser C2 is positive till the projectile reaches its uppermost point in the flight trajectory. After the projectile has reached the top of the flight trajectory its velocity and thereby the generator frequency will increase, the voltage $U_{C2}$ across the condenser C2 thereby decreasing. Hence the blocking of the voltage regulator VR (FIG. 3) is terminated and the voltage supply to the remaining firing circuit of the projectile will be established.

What I claim is:

1. A proximity fuse for high trajectory weapons, comprising: ram driven generator means for generating a supply voltage; electronic circuit means for controlling the proximity functions of said fuse, said electronic circuit means being driven by said supply voltage; detector means for receiving said supply voltage and for detecting the increase or decrease in the frequency thereof; and blocking means operated by said detector means for generating a blocking signal for blocking the supply voltage to the electronic circuit means, said blocking means generating said blocking signal upon receipt of a signal from said detector means upon the detection thereby of a decreasing frequency in said generated supply voltage, said blocking signal being terminated when an increasing frequency is detected.

2. The proximity fuse as claimed in claim 1, wherein said detector means for detecting the frequency of said supply voltage comprises a differential amplifier to which said supply voltage is applied after being top rectified by rectifier means, said amplifier having a larger gain in the range where said top rectified supply voltage changes from a decreasing to an increasing value.

3. The proximity fuse as claimed in claim 1, wherein means are provided for supplying said voltage from said generator means as rectangular pulses, said pulses having an approximately constant amplitude and a pulse width inversely proportional to the frequency of said generator means; first condenser means across which said pulses are top rectified; second condenser means charged by said first condenser means, the increasing charging of said second condenser means resulting from decreasing generator frequency, and the discharging of same resulting from increasing generator frequency; differentiator means by means of which the voltage across said second condenser operates said blocking means to block the generator voltage at decreasing rotational speed of said generator means and to terminate the blocking at increasing rotational speed.

4. The proximity fuse as claimed in claim 1, further comprising delay means for preventing the increasing rotational speed of said generator means which occurs immediately after launching from initiating unintentional detonation of said fuse.

5. Proximity fuse as claimed in claim 4, wherein said delay means comprises element means which must initially be activated before the blocking of the remaining circuit can be terminated.

* * * * *